United States Patent [19]
Scarpetti

[11] 3,820,874
[45] June 28, 1974

[54] STEREOSCOPIC PHOTOGRAPHIC PRINT, METHOD OF MAKING, AND APPARATUS FOR VIEWING

[75] Inventor: Julius J. Scarpetti, Revere, Mass.

[73] Assignee: Polaroid Corporation, Cambridge, Mass.

[22] Filed: Sept. 11, 1972

[21] Appl. No.: 287,628

Related U.S. Application Data

[63] Continuation-in-part of Ser. No. 203,898, Dec. 1, 1971, abandoned.

[52] U.S. Cl............................. 95/1 R, 95/18, 96/2, 350/132
[51] Int. Cl...................................................... G03b
[58] Field of Search............ 95/12.2, 18; 96/74, 85, 96/69, 2, 14, 17; 350/132

[56] References Cited
UNITED STATES PATENTS

| | | | |
|---|---|---|---|
| 193,998 | 8/1877 | Reynolds........................ | 95/18 R X |
| 1,003,300 | 9/1911 | Schwab............................. | 95/18 R |
| 1,084,492 | 1/1914 | Schwab............................. | 95/18 R |
| 1,595,295 | 8/1926 | Fairall............................ | 95/18 R X |
| 2,423,504 | 7/1947 | Land et al....................... | 350/132 X |
| 3,142,563 | 7/1964 | Alexander.................................. | 96/2 |
| 3,256,776 | 6/1966 | Land et al........................... | 350/132 |

Primary Examiner—Richard M. Sheer
Assistant Examiner—Kenneth C. Hutchison

[57] ABSTRACT

An improved bi-stimulus print incorporates a color filter on its back side. A variegated (multicolor) image of a subject printed on the bi-stimulus print is perceivable even though the image is formed from just two monochromatic images. In one embodiment, the bi-stimulus print comprises a red color separation image of the subject printed in grey tones on the back of a thin translucent sheet and a green color separation image of the same subject printed, in registration with the red color separation image, in grey tones on the front side of the translucent sheet. In a second embodiment the images are related stereoscopically. A red light filter is attached to the back of the bi-stimulus print. One can illuminate the front of the bi-stimulus print and see the image in black and white by reflected light; and by illuminating the rear of the bi-stimulus as well, one can perceive a variegated image by viewing a combination of the reflected light and the transmitted red light passed by the filter. The improvement is applicable to anaglyphs.

8 Claims, 1 Drawing Figure

PATENTED JUN 28 1974　　　　　　　　　　　　　　3,820,874
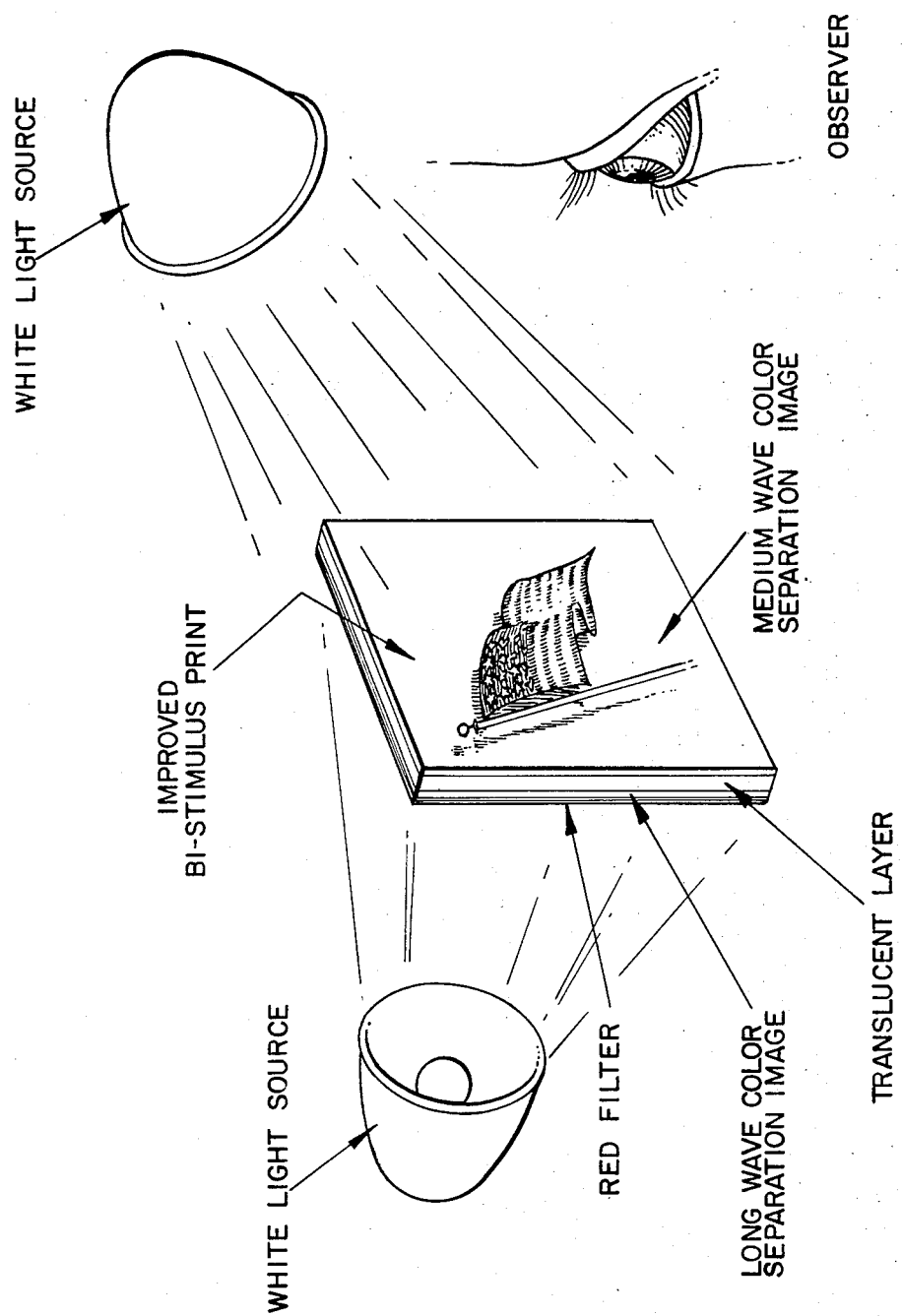

STEREOSCOPIC PHOTOGRAPHIC PRINT, METHOD OF MAKING, AND APPARATUS FOR VIEWING

CROSS REFERENCE TO RELATED APPLICATIONS

This application is a continuation-in-part of my abandoned application for U.S. patent, Ser. No. 203,898, filed Dec. 1, 1971.

BACKGROUND OF THE INVENTION

The present concepts concern both a method for producing a printed image of a colored subject that is perceivable in variegated color from just two monochromatic color separation images of the subject and the improved dual monochrome print produced by the method. Such a print is perceivable either as a monochrome image or as a variegated color image. Variegated color, as used herein, connotes the perception, by an observer, of more colors than classical color mixing equations would predict, but not necessarily "full" or "true" color.

Edwin H. Land previously described that the human eye can perceive reds, oranges, yellows, browns, greens, blues, and purples in images formed by projecting onto a screen just two monochromatic images. He explained his experiments in an article entitled "Experiments in Color Vision," Scientific American, May, 1959, p. 84, and in a subsequent letter published in the September, 1959 issue of that magazine. U.S. Pat. No. 3,003,391 issued Oct. 10, 1969 to Land discusses other aspects of those experiments.

The present concepts also concern anaglyphs. Prior art anaglyphs, usually comprising both a red and a blue image, were printed in overlapping registration on the same side of a sheet of paper. Consequently, they could be viewed only with an anaglyphoscope, because without such a device the appearance of the overlapping red and blue images disconcerted observers.

SUMMARY OF THE INVENTION

Practicing the present invention to obtain variegated images includes making two separate monochrome images of a subject from the same vantage point. The first monochrome image records the relative intensities of the middle visible wavelengths present in the subject by, for example, using a green filter to absorb and block the longer wavelengths. The second monochrome image records the relative intensities of the longer visible wavelengths present in the subject by, for example, using a red filter to absorb and block the shorter wavelengths. These images are referred to as the middle wavelength record and the long wavelength record, respectively. The middle wavelength record and the long wavelength record are printed in monochrome on opposite sides of a translucent sheet in precise registration with each other, forming a bi-stimulus print. Translucent, as used herein, means transmitting light but diffusing it to eliminate the perception of distinct images except of things adjacent. The term bi-stimulus print, as used herein, connotes a means for distinguishably recording and presenting two different aspects of a subject, e.g., color, perspective, etc.

One can view the bi-stimulus print so as to perceive a variegated image. By simultaneously illuminating the middle wavelength record of the bi-stimulus print with white light and the long wavelength record of the bi-stimulus print with red light, from their respective sides of the translucent sheet, and viewing the bi-stimulus print to see the white light reflected therefrom and the red light diffusely transmitted therethrough combined, one perceives a variegated image of the original subject.

The improved bi-stimulus print disclosed in this application includes an appropriate light filter at its rear side, in this instance a red light filter. Thus, one can use white light to illuminate both sides of the improved bi-stimulus print. Alternatively, by illuminating only one of the records of the improved bi-stimulus print, e.g., the middle wavelength record, and viewing the light reflected therefrom, one can see a black and white image of the original subject.

Anaglyphs, according to the present invention, include making a right and a left image of a subject from separate, but stereoscopically related, vantage points. In making the two images for a bi-stimulus anaglyph, color filters are not required unless a variegated stereoscopic image is desired. The right and the left images are printed on opposite sides of a translucent sheet maintaining proper stereo registration between them. To view a steroscopic image from a bi-stimulus anaglyph, the rear image is illuminated with one color of light, e.g., red, that the translucent sheet transmits and the front image is illuminated by another color, e.g., green, that the translucent sheet reflects. An improved bi-stimulus anaglyph includes an appropriate color filter at its rear side, in this instance a red light filter. Thus, one can use white light to illuminate the rear of the improved bi-stimulus anaglyph. The observer uses a properly coded anaglyphoscope that restricts each eye to seeing a different one of the two images. Stereoscopic perception of the combined images results. Without any visual aids, the observer can see a clear monoscopic image of the subject by reflected light.

The concepts disclosed herein, for an improved bi-stimulus print incorporating a color filter at its rear so ordinary white light can be used for the rear illumination, apply also to my copending application, Ser. No. 203,688, filed Dec. 1, 1971, now U.S. Pat No. 3,776,725.

Accordingly, an object of the present invention is to provide a bi-stimulus print, having an image recorded thereon that can be perceived either in color or in black and white, improved by the inclusion of an appropriately colored light filter on its rear side.

Another object of the present invention is a method for making a special black and white improved bi-stimulus print with an image recorded thereon that can be perceived in a variety of colors.

Still a further object of the present invention is to provide a bi-stimulus anaglyph, viewable either stereoscopically with the aid of an anaglyphoscope or monoscopically without any visual aids, improved by the inclusion of an appropriately colored light filter on its rear side.

Yet another object of the present invention is a method for making the improved bi-stimulus variegated anaglyph.

Other objects and many of the attendant advantages of the present invention will be better appreciated and said invention will become more clearly understood by reference to the following detailed description taken in connection with the accompanying drawing wherein:

The sole FIGURE illustrates a bi-stimulus print and lights arranged for viewing a variegated image.

DESCRIPTION OF THE PREFERRED EMBODIMENT

A bi-stimulus print according to the present invention comprises a long wavelength and a middle wavelength color separation image disposed on opposite sides of a translucent sheet and an appropriate color filter on the back of said print. Long wavelength and middle wavelength refer to the wavelengths commonly recognized as the red and green portions of the light spectrum.

In the preferred method for making the bi-stimulus print, two different photographs of a multicolored object are made with precisely the same point of view and magnification. The first photograph, made through a green filter, records the relative intensities of the middle wavelength color components present in the object. The second photograph, made through a red filter, records the relative intensities of the long wavelength color component present in the object.

The optimum exposure balance between the negative of the red and the green records will yield similar densities on both records within the image of any neutral object present in the field. An 18 percent grey card, of the type commonly used for color separation photography, placed in the field serves as an ideal neutral object. The red and green color separation exposures are individually adjusted to produce equal densities in the image of the grey card on the negatives of the red and on the green records. The exact exposure required for each record is determined experimentally and will depend on the film used and other variables known to those familiar with photography. Generally, the red record will require more exposure than the green record to achieve the desired equal densities in the image of the neutral object.

While the preferred colors for making the long and middle wavelength records of the multi-colored object are red and green, it is important to understand that other color choices, e.g., blue and orange or green and orange, will also work providing a long wavelength-relatively shorter wavelength stimulus relationship between the stimuli is maintained. The invention contemplates the use of such other colors. Generally, a color associated with a light wavelength shorter than 580 nanometers works best as the middle wavelength stimulus in conjunction with a color associated with a light wavelength longer than 580 nanometers as the long wavelength stimulus.

Using the two color separation pictures previously obtained, one with the long wavelength (red) record and the other with the middle wavelength (green) record, the bi-stimulus print is made by printing or placing them in precise registration on opposite sides of a translucent sheet, preferably with the green record in front. The translucent sheet must diffusely transmit light as well as reflect it. A thin translucent material such as paper serves quite well.

Experience has taught that the printed rear (red) record should possess relatively strong contrast while the printed front (green) record should possess normal contrast because the front image will often be viewed directly, i.e., in reflected light. The contrast of the rear record may be increased by any suitable method in the printing or prior thereto.

Printing as used herein includes recording the images by direct photography, photocopying, printing with half-tone screens, lithography, and any other suitable method for recording or duplicating the required color separation images. While it is preferred to print the two color separation images on opposite sides of the same translucent sheet, it is also possible to print them on separate sheets and then place them together in registration.

One may see the bi-stimulus print as a monochrome, black and white print either by illuminating the front surface and viewing the bi-stimulus print by the reflected light or by illuminating the rear surface and viewing the bi-stimulus print by the transmitted light. To view the bi-stimulus print so as to perceive a variegated image, one provides two stimuli by illuminating the front and the rear of the bi-stimulus print. When illuminating both sides of the bi-stimulus print so as to perceive the variegated image, a middle wavelength-long wavelength relation must exist between the front and rear light sources.

In the present example, a red light illuminates the long wavelength (red) record on the rear of the bi-stimulus print. The translucent support layer transmits some of the red light modulated according to the densities of the long wavelength (red) record. A white light illuminates the middle wavelength (green) record on the front of the bi-stimulus print. The support layer reflects the white light modulated according to the densities of the middle wavelength (green) record.

Alternatively, the proper relation between the front and rear light sources can be achieved by incorporating an appropriate (red) color light filter on the back of the bi-stimulus print. A color light filter located at the rear of the bi-stimulus print will filter the light transmitted to an observer through the back of the bi-stimulus print and not filter the light reflected to the observer from the front of the bi-stimulus print. A color light filter at the front of the bi-stimulus print will filter the reflected light as well as the transmitted light.

The FIGURE schematically illustrates the foregoing arrangement. It shows the improved bi-stimulus print with a medium wavelenth color separation image of a flag on the front, toward the observer, a long wavelength color separation image of the flag, and a red filter on the rear, away from the observer. The two images are separated by a translucent layer and are in registration with each other. The FIGURE also shows a white light source illuminating the front of the bi-stimulus print to provide a stimulus for the observer by reflection. It shows another white light source illuminating the rear of the bi-stimulus print to provide another stimulus for the observer by transmission.

The use of white light to illuminate the front of the bi-stimulus print provides a more pleasing color balance than would just green light. Also, the use of white light permits the use of a household lamp or other common light source for illuminating the bi-stimulus print. The red light source can be a simple light box with a red filter and means for varying the brightness of the light. In the improved bi-stimulus print, the red filter is incorporated on the back of the print instead of on the light box. After placing a bi-stimulus print over the light box, the brightness of the light is adjusted to balance the intensity of the transmitted long wavelength (red) stimulus with the intensity of the reflected middle wavelength (white light) stimulus. In this way, an observer can perceive from the combined sensations produced by the long wavelength and middle wavelength stimuli of the bi-stimulus print the variegated image of the original object.

A simple demonstration of the variegated color images obtained with the invention employs self-processing photographic materials of the kind sold by the Polaroid Corporation, Cambridge, Massachusetts. Fresh fruit, arranged on the copy surface of an industrial copy camera, serves as a subject for a bi-stimulus print according to the concepts taught herein. Polaroid Type 57 Land film, exposed through a No. 25 Wratten filter for 1/8 second at f/22 provides the red record of the fresh fruit, and Polaroid Type 55 Land film, exposed through a No. 58 Wratten filter for 20 seconds at f/22 provides the green record. After applying a protective coating to the prints containing the red and green records and allowing them to dry, they are assembled to form the bi-stimulus print so the green record will face the observer with the red record behind it and in registration therewith. A red light filter is located behind the green record. Tape holds the several elements of the improved bi-stimulus print together and in registration with each other. When viewed in a lighted room with a high-intensity light behind it, the bi-stimulus print appears to the observer in a greater array of colors than classical color theory would predict.

The color light filter can be incorporated into the bi-stimulus print between the rear record and the translucent sheet or behind both of them. The functional limitation on the location of the light filter in the bi-stimulus print assembly is that it be located so it colors only one of the two light stimuli and not the other. This invention contemplates the use of a separate light filtering lamina in the bi-stimulus print and also printing, staining, or coating an appropriate filtering medium or dye onto the rear of either the translucent sheet or the assembled bi-stimulus print.

The reader will now understand that colors other than those described herein are useful in viewing a bi-stimulus print providing, as in making the bi-stimulus print, the long wavelength-shorter wavelength relationship is observed. It is not required that the colors of light used for viewing the bi-stimulus print are the same colors used for recording the bi-stimulus print.

A bi-stimulus anaglyph according to the present invention comprises right perspective and left perspective stereoscopically related images of a subject disposed on opposite sides of the translucent sheet in registration with each other. Two photographs are made of the subject from different, but stereoscopically related, vantage points. The first records a right perspective view of the subject and the second records a left perspective view of the subject. The first (right) photograph is printed on the front of the translucent sheet and the second (left) is printed on the rear of the translucent sheet in stereoscopic registration with the first. Illuminating the front of the bi-stimulus anaglyph permits an observer to view an ordinary image of the subject.

A stereoscopic image is seen when the bi-stimulus anaglyph is illuminated on its face by a first color of light, e.g., green, and on its rear by a second color of light, e.g., red, and the observer utilizes a properly coded anaglyphoscope. The properly coded anaglyphoscope has the form of a pair of spectacles with a red filter instead of a left lens and a green filter instead of a right lens. Some of the red light illuminating the left perspective view printed on the rear of the bi-stimulus anaglyph passes therethrough and reaches the left eye of the observer through the red filter of the anaglyphoscope, but none of the red light reaches his right eye because the green filter absorbs it beforehand. Likewise, the green light illuminating the right perspective view on the front of the bi-stimulus anaglyph reflects therefrom and reaches the right eye of the observer through the green filter of the anaglyphoscope, but none of it reaches his left eye because the red filter absorbs it beforehand. Accordingly, the observer's right eye sees only the right perspective view of the subject (reflected from the front of the bi-stimulus anaglyph) and his left eye sees only the left perspective view of the subject (transmitted through the bi-stimulus anaglyph from its rear). Stereoscopic perception of the images results in the usual way for anaglyphs.

It will now be understood that variegated perception of the stereoscopic image will result if the original right and left perspective views are made as color separations as well. Thus, the left perspective view for the rear of the bi-stimulus anaglyph might also embody the long wave record while the right perspective view for the front of the bi-stimulus anaglyph might also embody the medium wave record.

It can be readily understood now that many variations and modifications of the present invention are possible in light of the foregoing teachings, and it will be apparent to those skilled in the art that various changes in form and arrangement may be made to suit certain requirements without departing from the scope of the invention. It is, therefore, to be understood that within the scope of the appended claims, the instant invention may be practiced in a manner than otherwise specifically described herein.

What is claimed is:

1. A print comprising:
   a translucent sheet;
   first image means, on the front of said translucent sheet, for presenting one of a pair of stereoscopically related views of a subject;
   second image means, at the rear of said translucent sheet, for presenting the other of said pair; and
   filter means, also at said rear of said translucent sheet, for permitting the transmission through both of said image means of a preselected color of light and for inhibiting the transmission of other colors of light.

2. A method for making an anaglyph print of a subject, comprising the steps of:
   forming a first image that records a right perspective view of said subject;
   forming a second image that records a left perspective view of said subject that is stereoscopically related to said right perspective view;
   disposing said first image and said second image on opposite sides of a translucent sheet;
   registering said first image in selected alignment with said second image; and
   forming a color light filter on one side of said translucent sheet.

3. A bi-stimulus anaglyph print, comprising:
   a translucent sheet;
   a first image of a subject on the front of said translucent sheet;

a second image of said subject, at the rear of said translucent sheet, said second image being stereoscopically related to said first image; and color filter means, on said back surface, for permitting the transmission of a preselected color of light and for inhibiting the transmission of other colors of light.

4. The bi-stimulus anaglyph print described in claim 3, wherein said first and second images have a predetermined registration with respect to each other.

5. A print, comprising:

a translucent layer capable of reflecting light;

first image means, on the front of said translucent layer, for presenting a left perspective of a subject; and second image means, at the rear of said translucent layer, for presenting a right perspective of said subject stereoscopically related to said left perspective, whereby light reflecting from said translucent layer will preclude perception of said second image means by an observer except by means of light transmitted through said translucent layer.

6. A bi-stimulus anaglyph print, comprising:

a translucent layer capable of reflecting light;

a first image of a subject on the front of said translucent layer;

a second image of said subject, at the rear of said translucent layer, said second image being stereoscopically related to said first image, whereby light reflecting from said translucent layer will preclude perception of said second image means by an observer except by light transmitted through said translucent layer.

7. The bi-stimulus anaglyph print described in claim 6, wherein said first and second images have a predetermined registration with respect to each other.

8. A system by means of which an observer may view an image, comprising:

first image means for storing a first perspective view of a subject;

second image means, adjacent said first image means and in registration therewith, for storing a second perspective view of said subject stereoscopically correlated to said first perspective view of said subject;

first illuminating means for illuminating said first image means with white light;

second illuminating means for illuminating said second image means with red light;

reflecting means between said first image means and said second image means for reflecting a substantial amount of said white light from said first illuminating means toward said observer; and transmitting means between said first image means and said second image means for transmitting a substantial amount of said red light from said second illuminating means toward said observer.

* * * * *